United States Patent [19]

Gross

[11] 4,242,626
[45] Dec. 30, 1980

[54] AC MOTOR DRIVE

[75] Inventor: Thomas A. O. Gross, Lincoln, Mass.

[73] Assignee: Jet Spray Cooler, Inc., Waltham, Mass.

[21] Appl. No.: 933,716

[22] Filed: Aug. 15, 1978

[51] Int. Cl.³ .............................................. H02P 7/42
[52] U.S. Cl. .................................... 318/772; 318/810
[58] Field of Search ............... 318/138, 245, 772, 807, 318/808, 810, 811

[56] References Cited

U.S. PATENT DOCUMENTS

| | | | |
|---|---|---|---|
| 3,321,688 | 5/1967 | Von Delden | 318/138 |
| 3,416,057 | 12/1968 | Froyd et al. | 318/138 X |
| 3,543,114 | 11/1970 | Tadakuma et al. | 318/138 |
| 3,609,490 | 9/1971 | Keranen | 318/807 |
| 4,080,554 | 3/1978 | Nordby | 318/808 |

*Primary Examiner*—Gene Z. Rubinson
*Attorney, Agent, or Firm*—Wolf, Greenfield & Sacks

[57] ABSTRACT

The drive circuit operates a shaded pole motor having in the disclosed embodiment three windings of turns N, N/2 and N/2. The control is basically two-speed control with the lower speed operation being adjustable by means of the drive circuit and with the high speed operation being directly from the AC line. The drive circuit includes a clock, frequency adjustment means, power inverters and unilateral means for limiting power consumption.

11 Claims, 1 Drawing Figure

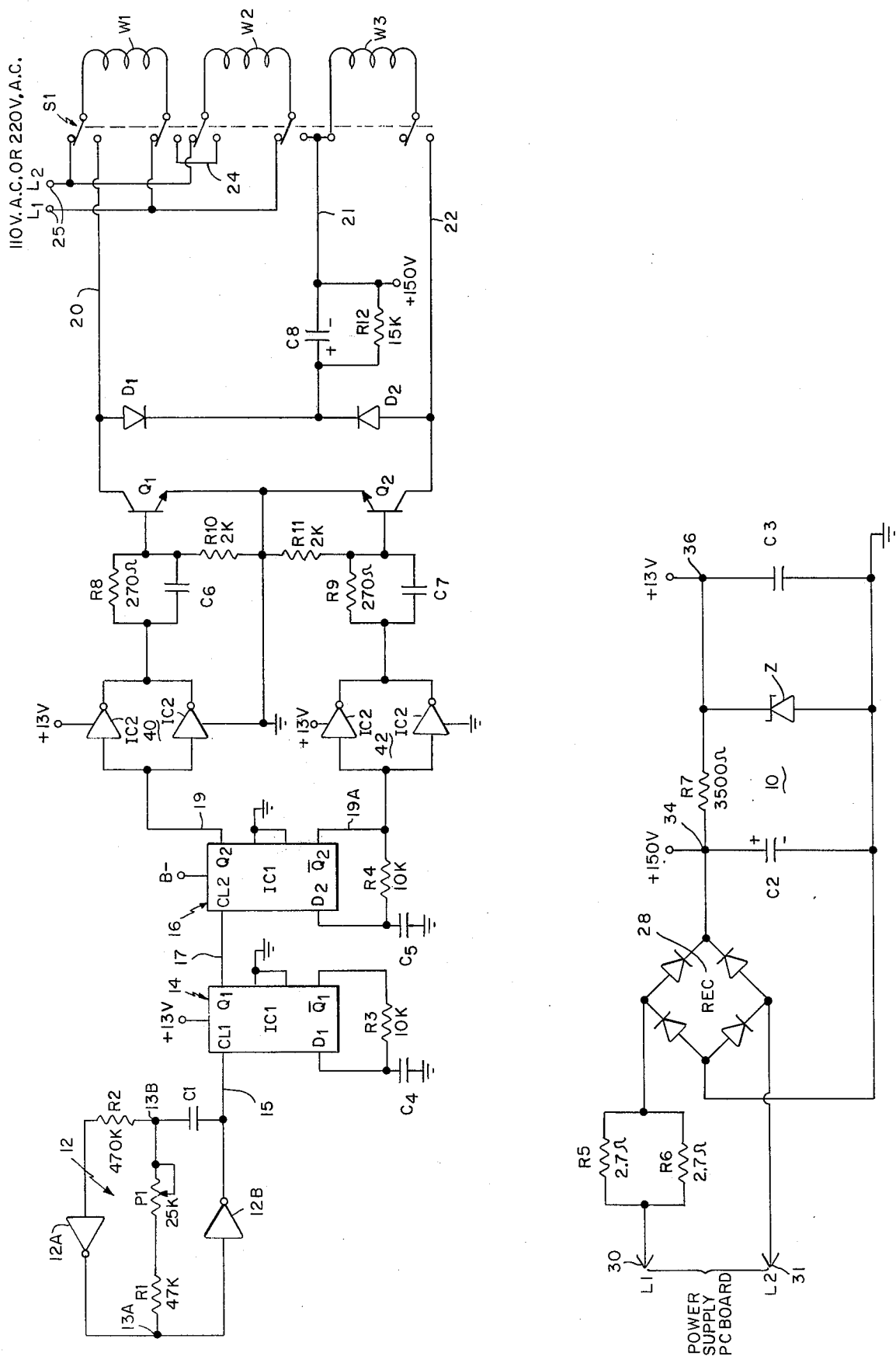

AC MOTOR DRIVE

BACKGROUND AND SUMMARY OF THE INVENTION

The present invention relates in general to motor control circuitry and pertains, more particularly, to a motor drive circuit for an AC motor such as a shaded pole motor. In accordance with the invention alternate control is provided wherein high speed operation the windings are directly driven from the AC source and for lower speed operation the drive circuit is adjustable to provide the capability of adjustable variable speed control. The control circuit of this invention may be used with, for example, a milk shake machine for mixing control.

One object of the present invention is to provide an improved drive control circuit for an AC motor. The motor of the present invention is preferably a shaded pole motor having advantages over a DC motor with regard to a cheaper cost and also with regard to the fact that the AC motor does not require mechanical brush commutation.

Another object of the present invention is to provide an improved AC motor drive circuit providing essentially two-speed control and wherein at least one of the speeds is preferably adjustable. In accordance with the present invention, high speed operation is provided by direct control of the windings of the motor from the AC source while the lower speed operation is via the adjustable control circuit.

A further object of the present invention is to provide an approved AC motor drive circuit that is relatively simple in construction having means for limiting energy consumption by at least partial recovery of energy used as a drive current to the windings.

To accomplish the foregoing and other objects of this invention, there is provided a motor drive circuit for driving the windings of an AC motor such as a shaded pole motor. The motor drive circuit comprises an oscillator or clock means and first and second semi-conductor switching means, each having at least an input control electrode and an output electrode. Means are provided, preferably including at least one bistable device coupled from the clock means for generating complementary cyclic signals for controlling the input control electrodes, respectively, of the semi-conductor switch means. The drive circuit also includes a load impedance means, which in a preferred embodiment comprises a parallel circuit of a capacitor and resistor coupled to the high voltage supply which may be a 150 volt supply. First and second unilateral conducting devices couple, respectively, from the output electrodes of the first and second semiconductor switching means to this load impedance means. Lastly, conductive connections are made from the semi-conductor switching means at their output electrodes to the motor windings.

In accordance with the present invention the control is essentially a two-speed control including a switch means for providing the two different modes of control. In the system of this invention means are provided for generating complementary drive signals and there is also provided an input means for receiving an AC drive voltage. The switch means may be operated in one mode for coupling the complementary drive signals to a series connection of the windings while in the other mode the switch means couples the AC drive voltage to a parallel connection of the windings. In the actual disclosed embodiment the motor windings comprise three windings of turns N, N/2 and N/2. In the one mode of operation, all three windings are connected in series by operation of the switch while in the other mode of operation, only the two N/2 windings are connected in parallel.

DESCRIPTION OF THE DRAWINGS

Numerous other objects, features and advantages of the invention now become apparent upon a reading of the following detailed description taken in conjunction with the accompanying drawing which shows a circuit diagram depicting a preferred embodiment of the motor control of this invention.

DETAILED DESCRIPTION

The drawing shows a preferred embodiment of the present invention which generally comprises a power supply 10, a clock 12, bistable devices 14 and 16, inverter transistors Q1 and Q2, and unilaterial device D1 and D2. Three output lines 20, 21 and 22 couple to the windings W1, W2 and W3 of the AC motor which is preferably a shaded pole motor. In accordance with the invention for low speed operation the control is by way of lines 20, 21 and 22 to the series connection of windings W1, W2 and W3. For high operation, windings W1 and W2 are connected in parallel by means of the switch S1 with both of these windings connected to a conventional AC source such as 110 VAC or 200 VAC connected at terminals 25.

The power supply 10 includes a rectifier bridge 28 of conventional design having four interconnected diodes. The input to this bridge circuit is by way of parallel resistors R5 and R6 to the input terminals 30 and 31 which may connect to an alternating source of 220 VAC. The output connections from the rectifier bridge 28 couple across capacitor C2 for providing at node 34 a voltage which is an unregulated DC voltage of approximately +150 volts. This DC voltage source, it is noted, connects to one side of the parallel combination of capacitor C8 and resistor R12, for providing a source of power for drive to the windings of the motor. In addition to the DC source for the motor, there is also required for the control circuitry, such as the bistable devices 14 and 16, a lower voltage which is shown in the drawing as a +13 volt level generated at node 36. The power supply circuit 10 thus also includes resistor R7 in series with zener diode Z. A second capacitor of the power supply, namely capacitor C3 is coupled in parallel to the zener diode Z. Capacitors C2 and C3 shown in the drawing are filter capacitors for stabilizing the voltage and the voltage at node 36 is regulated by means of the zener diode to a proper relatively low DC voltage level for operation of some of the integrated circuits shown in the drawing.

The clock or oscillator 12 comprises a pair of inverters 12A and 12B intercoupled in a loop including resistor R2 and capacitor C1. Also, there is coupled between nodes 13A and 13B a potentiometer P1 in series with resistor R1. This circuit arrangement provides an oscillator whose frequency is dependent upon at least the value of capacitor C1 and the value of the resistors used in the circuit. The primary frequency control is by means of adjustment of the potentiometer P1. The capacitor C1 and associated resistors essentially form a delay network for providing the oscillating action. Thus, at the output line 15 from clock 12 there may be provided an unsymmetrical pulse waveform which couples to the D type flip-flop device 14.

The flip-flop 14 has a delay circuit associated therewith including resistor R3 and capacitor C4. Similarly, the flip-flop 16 has a delay circuit associated therewith including resistor R4 and capacitor C5. These delay circuits prevent erroneous operation of these flip-flops. Each of the flip-flops 14 and 16 may be of the type that are triggered by a positive rising input pulse and because of the connection of the resistors R3 and R4 these flip-flops change state upon receipt of each positive going transistor. Thus, the output on line 17 from flip-flop 14 is a 50% duty cycle signal having a frequency of half that of the input signal on line 15. Similarly, the output signal on line 19 from the flip-flop 16 is also 50% duty cycle signal having a frequency of one-half the frequency on line 17. The output pulse signal on line 19 is taken from the assertion output of flip-flop 16 referred to as the Q2 output. The negation output is developed on line 19A and is taken from the negation output of this flip-flop referred to as output $\overline{Q2}$. The output pulse waveforms on lines 19 and 19A are complementary signals so that when the signal on line 19 is at a high voltage level of say +6 volts, the output on line 19A is at ground. Similarly, when the voltage on line 19 is at a 0 volt level, voltage on line 19A is at its high level state.

The use of two bistable devices 14 and 16 is preferred as these devices are relatively inexpensive and also enable use of a higher frequency oscillator or clock 12. There is an advantage in using a high frequency clock in that a smaller capacitor C1 can then be used.

The complementary outputs from the flip-flop 16 connect to drivers 40 and 42. Each driver, such as driver 40 includes a pair of amplifying inverters. The output from the drivers couple by way of a resistor-capacitor circuit to transistors Q1 and Q2. Thus, the output from driver 40 couples by way of resistor R8 and capacitor C6 to transistor Q1 while the output from driver 42 couples by way of resistor R9 and capacitor C7 to the base electrode of transistor Q2. The emitter electrodes of both transistors Q1 and Q2 tie in common to ground potential. Similarly, one side of resistors R10 and R11 also tie to ground. The circuitry coupling between the drivers and these inverter transistors provides pulse differentiation of the square wave signal from the drivers.

The input signals to transistors Q1 and Q2 provide for alternate, mutually exclusive, operation of these transistors. Thus, when transistor Q1 is in conduction, transistor Q2 is off and vice-versa.

In the drawing the switch S1 is a multi-pole switch having basically two positions. In the drawing the switch is shown in a position wherein winding W3 is open and is thus not driven with any current while windings W1 and W2 are connected in parallel to the input voltage lines connecting to terminals 25. An alternating source of either 110 VAC or 220 VAC couples to the terminals 25. The winding W3 may have end turns while the windings W1 and W2 have N/2 turns each. Thus, for high speed operation directly from an alternating source the winding W3 is open and the two windings W1 and W2 each of turns N/2 are driven in parallel through the connections of the switch S1 depicted in the drawing. Thus, for high speed operation the control is by means of the alternating signal at terminals 25 and the control from lines 20, 21 and 22 is not employed for this high speed, single speed operation. However, it is desirable to also have a second basic speed of operation which is a lower speed which is also preferably adjustable. With regard to the application for use with a milk shake machine, the high speed range may be used for mixing while the low speed range is for high temperature full bowl operation.

For the low speed range where adjustability is desired, switch S1 is moved to the opposite position depicted in the drawing thus placing all windings W1, W2 and W3 in series. The position of switch S1 then couples winding W3 between lines 21 and 22 while windings W1 and W2 are connected in series with the assistance of jumper 24 between lines 20 and 21. The line 21 may be considered as a common line to the windings. The winding W3 has N turns and thus the motor is driven with equal number of turns between lines 20 and 21 and lines 21 and 22.

For the low speed control the complementary drive of transistors Q1 and Q2 control motor speed. Normally, the collectors of these transistors tie directly to the motor windings. However, in accordance with the invention diodes D1 and D2 are provided having their anodes coupled respectively from the collectors of transistors Q1 and Q2 and having their cathodes tied in common to a load comprised of capacitor C8 in parallel with resistor R12 tied to the DC voltage source generated at node 34 of the power supply. Without the use of these unilateral conducting devices, the voltage on lines 20 and 22 is typically at least 700 volts and could easily be as high as one kilovolt. In order to recover this energy and limit the power consumption to the windings, diodes D1 and D2 are provided coupled to the load impedance. In this connection the line 21 is actually coupled directly to the +150 volt DC source. Thus, for example, when transistor Q1 commences conduction, the diode D1 limits the voltage on line 20 to about 350 volts rather than a valve of at least twice that amount with conventional drive control arrangements. Similarly, the diode D2 limits the voltage on line 22 during conduction of transistor Q2. The capacitor C8 has a peak voltage thereacross on the order of 200 volts.

In the preferred embodiment the load impedance comprises both capacitors C8 and resistor R12. However, in an alternate embodiment of the invention the load impedance may simply be resistive in which case there is some loss in efficiency.

The following is a table showing all of the components in the drawings and preferred values thereof:

| Capacitors | |
|---|---|
| C1 | .056μfd., 10%, 100V. Polycarbonate |
| C2 | 50μfd., 250 V. Aluminum Electrolytic; Sprague TVA-1512 |
| C3 | 22μfd., 16V. Tantalum Electrolytic; G.E. TA07E226KB. |
| C4–C7 | .05μfd, 20V, Ceramic; Centralab UK20-503 or ARCO 1DP-2-563 100 V. Mylar. |
| C8 | 8μfd, 250V, Aluminum Electrolytic; Sprague TVA 1503. |
| Diodes | |
| D1 & 2 | Motorola or Texas Inst. #1N4005. |
| Trim Pot | |
| P1 | Single-turn Cermet Model 53-1 25K Ohms Spectrol or CTS Type Trimmer 360T 25K Ohms |
| Transistors | |
| Q1 & Q2 | Texas Inst. T1P54 |
| Resistors | |
| R1 | ⅛ Watt 47K Ohm 5% |
| R2 | ⅛ Watt 470K Ohm 10% |

-continued

| | |
|---|---|
| R3 & 4 | ¼ Watt 10K ohm 10% |
| R5 & 6 | 1 Watt 2.7 Ohm 10% Composition |
| R7 | 12 Watt 4000 Ohm WW |
| R8 & 9 | ¼ Watt 430 Ohm 10% |
| R10 & 11 | ¼ Watt 2K Ohm 10% |
| R12 | 5 Watt 15K Ohm WW |
| Zener Diode | |
| Z | 13 Volt 1 Watt; Motorola 1N4743. |
| Bridge Rectifier | |
| REC | 1 AMP, 200 Volt: Varo VE27 or Motorola MDA 102A or 3N248 |
| Inverters | |
| C-MOS 4049 | Motorola, RCA, Solid State Scientific |
| Flip-Flops | |
| 14 & 16 | C-MOS 4013 |

What is claimed is:

1. A motor drive circuit for driving the windings of an AC motor comprising;
   clock means,
   first and second semiconductor switch means each having at least a control electrode and first and second output electrodes,
   means responsive to said clock means for generating cyclic signals for controlling the control electrodes respectively, of the semiconductor switch means,
   load impedance means,
   DC source means including means coupling to one side of the load impedance means and means coupling to the windings,
   first and second unilateral conducting means coupling respectively, from the first output electrode of the first and second semiconductor switch means to the other side of the load impedance means.
   and means coupling the semiconductor switch means to the motor windings.

2. A motor drive circuit as set forth in claim 1 wherein the clock means includes frequency adjustment means for controlling motor speed.

3. A motor drive circuit as set forth in claim 1 wherein said means for generating cyclic signals includes bistable means for providing complementary square wave signals of on the order of 50% duty cycle at complementary outputs thereof.

4. A motor drive circuit as set forth in claim 3 wherein the semiconductor switch means each comprise a power transistor having a common electrode connection between the second electrode of the transistors.

5. A motor drive circuit as set forth in claim 4 wherein the load impedance means includes a resistor-capacitor circuit.

6. A motor drive circuit as set forth in claim 1 wherein said means coupling the semiconductor switch means to the motor winding includes separate electrical connection means from the first output electrodes to the windings.

7. A motor drive circuit as set forth in claim 1 wherein the load impedance means includes capacitor storage means.

8. A motor drive circuit as set forth in claim 7 wherein the unilateral conducting means include a diode.

9. A system for controlling an AC motor having a plurality of windings comprising;
   means for providing complementary drive signals,
   means for receiving an AC drive voltage,
   switch means having two modes in one mode coupling the complementary drive signals to a series connection of the windings, and in the other mode coupling the AC drive voltage to a parallel connection of the windings.

10. A system as set forth in claim 9 wherein the motor windings comprise three of turns N, N/2, and N/2, with the two N/2 windings being in parallel in the other mode and with all three windings in series in the one mode.

11. A system as set forth in claim 10 including unilateral conducting means coupling to the means for providing complementary drive signals.

* * * * *